United States Patent
Imanishi et al.

(10) Patent No.: US 6,875,151 B2
(45) Date of Patent: Apr. 5, 2005

(54) TOROIDAL-TYPE CONTINUOUSLY VARIABLE TRANSMISSION

(75) Inventors: Takashi Imanishi, Kanagawa (JP); Hisashi Machida, Kanagawa (JP)

(73) Assignee: NSK Ltd., Tokyo (JP)

( * ) Notice: Subject to any disclaimer, the term of this patent is extended or adjusted under 35 U.S.C. 154(b) by 113 days.

(21) Appl. No.: 10/212,057

(22) Filed: Aug. 6, 2002

(65) Prior Publication Data

US 2003/0032522 A1 Feb. 13, 2003

(30) Foreign Application Priority Data

Aug. 7, 2001 (JP) ........................... P.2001-239173

(51) Int. Cl.$^7$ ............................................. F16H 15/38
(52) U.S. Cl. ............................................. 476/46; 476/40
(58) Field of Search ............................ 476/40, 42, 46

(56) References Cited

U.S. PATENT DOCUMENTS

| | | | |
|---|---|---|---|
| 1,715,045 A | * | 5/1929 | Richer ........................ 475/216 |
| 4,964,312 A | * | 10/1990 | Kraus .......................... 476/10 |
| 6,375,593 B2 | * | 4/2002 | Miyata et al. ................ 476/40 |
| 2001/0018383 A1 | * | 8/2001 | Sugihara et al. ............. 476/41 |

FOREIGN PATENT DOCUMENTS

| | | |
|---|---|---|
| JP | 62-71465 | 5/1987 |
| JP | 1-173552 | 12/1989 |
| JP | 9-269039 | 10/1997 |

* cited by examiner

Primary Examiner—William C. Joyce
(74) Attorney, Agent, or Firm—Sughrue Mion, PLLC

(57) ABSTRACT

A toroidal-type continuously variable transmission has an input disk, an output disk, a pressing device for pressing said first disk toward said second disk, a plurality of trunnions having a pair of first support shafts for supporting a plurality of power rollers, a pair of support plates for supporting the first pivot shafts of each of the trunnions; and a pair of swing brackets each including a second pivot shaft parallel to the first pivot shaft of the trunnion, the swing brackets being respectively supported so as to be swingable about the second pivot shafts with respect to the support plates. The first pivot shafts of the trunnion are respectively supported so as to be swingable with respect to the support plates through the swing brackets.

5 Claims, 7 Drawing Sheets

TOROIDAL-TYPE CONTINUOUSLY VARIABLE TRANSMISSION

BACKGROUND OF THE INVENTION

Field of the Invention

A toroidal-type continuously variable transmission according to the invention is used as a transmission unit forming as an automatic transmission for a car or as a transmission for controlling the operating speeds of various industrial machines such as a pump. Especially, the invention relates to an improvement in a so called half-toroidal-type continuously variable transmission in which the peripheral surfaces of a plurality of power rollers and the inner surfaces of a pair of disks holding the power rollers between them are not present on the diameter-direction opposite sides of the centers of the inclined rotation of the power rollers.

As an example of a transmission unit forming a transmission for a car, there is known such a half-toroidal-type continuously variable transmission as shown in FIGS. 3 and 4 schematically. In this toroidal-type continuously variable transmission, as disclosed in JP-A-62-71465U, an input side disk 2 is supported concentrically with an input shaft 1 and an output side disk 4 is fixed to the end portion of an output shaft 3 which is disposed concentrically with the input shaft 1. In the interior of a casing 5 (see FIG. 6 which will be discussed later) in which a toroidal-type continuously variable transmission, there are disposed trunnions 7, 7 which can be swung about pivot shafts 6, 6 disposed at positions twisted with respect to the input shaft 1 and output shaft 3.

Specifically, a pair of pivot shafts 6, 6 are disposed on the outer surfaces of the two end portions of each trunnion 7 in such a manner that the two pivot shafts 6, 6 are concentric with each other. The center axes of the pivot shafts 6, 6 are present at twisted positions which do not intersect with the center axes of the input side and output side disks 2, 4 but exist in directions at right angles or almost at right angles to the directions of the center axes of the input side and output side disks 2, 4. Also, on the central portions of the respective trunnions 7, 7, there are supported the base half sections of displacement shafts 8, 8; and, in case where the trunnions 7, 7 are swung about the pivot shafts 6, 6, the inclination angles of the shifts shafts 8, 8 can be adjusted. On the peripheries of the front half sections of the displacement shafts 8, 8 supported on the trunnions 7, 7, there are supported power rollers 9, 9 in such a manner that they can be rotated. And, the power rollers 9, 9 are held by and between the inner surfaces 2a, 4a of the input side and output side disks 2, 4.

The sections of the mutually opposing inner surfaces 2a, 4a of the input side and output side disks 2, 4 are respectively formed in a concave surface having an arc-shaped section, while the concave surface can be obtained by rotating an arc having the pivot shaft 6 as a center thereof or by rotating a curved line close to such arc. And, the peripheral surfaces 9a, 9a of the power rollers 9, 9 each formed in a spherically convex surface are respectively contacted with the inner surfaces 2a, 4a of the input side and output side disks 2, 4. Also, between the input shaft 1 and input side disk 2, there is interposed a driving/pressing device 10 such as a loading cam device; and, the input side disk 2 can be rotated by the driving/pressing device 10 while it is elastically pressed toward the output side 4 by the driving/pressing device 10. By the way, the driving/pressing device 10 may also be composed of a combination of an oil-pressure type pressing device and a power transmission portion such as a spline engagement portion.

When the above-structured toroidal-type continuously variable transmission is in use, as the input shaft 1 is rotated, the driving/pressing device 10 rotates the input side disk 2 while pressing the input side disk 2 against the plurality of power rollers 9, 9. And, the rotational movement of the input side disk 2 is transmitted through the plurality of power rollers 9, 9 to the output side disk 4, so that the output shaft 3 fixed to the output side disk 4 can be rotated. When changing the rotation speed between the input shaft 1 and output shaft 3, firstly, to reduce the rotation speed between the input shaft 1 and output shaft 3, the trunnions 7, 7 may be swung about the pivot shafts 6, 6 and the displacement shaft 8, 8 may be inclined in such a manner that the peripheral surfaces 9a, 9a of the power rollers 9, 9, as shown in FIG. 3, can be respectively contacted with the near-to-center portion of the inner surface 2a of the input side disk 2 and the near-to-outer-periphery portion of the inner surface 4a of the output side disk 4. On the other hand, to increase the rotation speed between the input shaft 1 and output shaft 3, the trunnions 7, 7 may be swung and the displacement shaft 8, 8 may be inclined in such a manner that the peripheral surfaces 9a, 9a of the power rollers 9, 9, as shown in FIG. 4, can be respectively contacted with the near-to-outer-periphery portion of the inner surface 2a of the input side disk 2 and the near-to-center portion of the inner surface 4a of the output side disk 4. In case where the inclination angles of the displacement shafts 8, 8 are set intermediate between FIGS. 3 and 4, an intermediate transmission ratio can be obtained between the input shaft 1 and output shaft 3.

Further, FIGS. 5 and 6 show a more specified toroidal-type continuously variable transmission which is disclosed in JP-A-1-173552U. In this toroidal-type continuously variable transmission, an input side disk 2 and an output side disk 4 are respectively supported on the periphery of a circular-pipe-shaped input side rotary shaft 11 in such a manner that they can be rotated. Also, between the end portion of the input side rotary shaft 11 and input side disk 2, there is interposed a driving/pressing device 10 such as a loading cam device. On the other hand, an output gear 12 is coupled to the output side disk 4 in such a manner that the output side disk 4 and output gear 12 can be rotated synchronously.

Pivot shafts 6, 6, which are disposed on the two end portions of each of a pair of trunnions 7, 7 in such a manner that the pivots 6, 6 are concentric with each other, are supported on their associated pair of support plates 13, 13 in such a manner that they can be swung as well as can be shifted in the axial direction thereof (that is, in FIG. 5, in the front and back direction of the figure sheet; and, in FIG. 6, in the vertical direction). And, on the intermediate portions of the respective trunnions 7, 7, there are supported the base half sections of the displacement shafts 8, 8. Each of the displacement shafts 8, 8 is structured such that a support shaft portion 14 forming the base half section thereof and a pivot support shaft portion 15 forming the front half section thereof are eccentric to each other. And, the support shaft portions 14 are rotatably supported on intermediate portions of their associated trunnions 7, 7, while power rollers 9, 9 are rotatably supported on the peripheries of the pivot support shaft portions 15.

Also, between the outer surfaces of the power rollers 9, 9 and the inner surfaces of the intermediate portions of the trunnions 7, 7, there are disposed thrust ball bearings 16, 16 and thrust needle roller bearings 17, 17 in the order starting from the outer surfaces of the power rollers 9, 9. The thrust ball bearings 16, 16, while supporting thrust-direction loads applied to the power rollers 9, 9, allow the power roller 9, 9 to rotate. Also, the thrust needle roller bearings 17, 17, while supporting thrust loads applied from the power rollers 9, 9 to outer races 18, 18 forming the thrust ball bearings 16, 16, allow the pivot support shaft portions 15, 15 of the displacement shafts 8, 8 and the outer races 18, 18 to be swung about the support shaft portions 14, 14 of the displacement shafts 8, 8. Further, the trunnions 7, 7 can be shifted in the axial direction thereof by actuators 19, 19 of an oil pressure type. By the way, in the present specification, the expression "the axial direction of a trunnion" means the axial directions of a pair of pivot shafts respectively disposed on the two end portions of the present trunnion.

In the case of the above-structured toroidal-type continuously variable transmission, the rotational movement of the input side rotary shaft 11 is transmitted through the driving/pressing device 10 to the input side disk 2. And, the rotational movement of the input side disk 2 is transmitted through a pair of power rollers 9, 9 to the output side disk 4 and further the rotational movement of the output side disk 4 is taken out from the output gear 12. To change the rotation speed ratio between the input side rotary shaft 11 and output gear 12, the pair of trunnions 7, 7 may be respectively shifted by their associated actuators 19, 19 in the mutually opposite directions, for example, in such a manner that the power roller 9 shown on the right side in FIG. 6 is shifted upwardly in FIG. 6, whereas the power roller 9 shown on the left side in FIG. 6 is shifted downwardly in FIG. 6. This changes the direction of a tangential-direction force acting on the contact portions between the peripheral surfaces 9a, 9a of the power rollers 9, 9 and the inner surfaces 2a, 4a of the input side and output side disks 2, 4. And, due to the change in the direction of the tangential-direction force, the trunnions 7, 7 are swung in the mutually opposite directions about the pivot shafts 6, 6 which are pivotally supported on the support plates 13, 13. This changes the contact positions between the peripheral surfaces 9a, 9a of the power rollers 9, 9 and the inner surfaces 2a, 4a of the input side and output side disks 2, 4, as shown in FIGS. 3 and 4, with the result that the rotation speed ratio between the input side rotary shaft 11 and output gear 12 is changed.

In the power transmission by the toroidal-type continuously variable transmission, the power rollers 9, 9 are shifted in the axial direction of the input side rotary shaft 11 in accordance with the elastic deformation of the respective components of the toroidal-type continuously variable transmission. And, the displacement shafts 8, 8 supporting the power rollers 9, 9 are slightly rotated about their associated support shaft portions 14. Due to this slight rotation, the outer surfaces of the outer races 18, 18 of the thrust ball bearings 16, 16 and the inner surfaces of the trunnions 7, 7 are shifted relative to each other. Between these outer and inner surfaces, there are interposed the thrust needle roller bearings 17, 17 and, therefore, such relative shift can be attained with a small force.

Also, in order to be able to increase the power that can be transmitted by the toroidal-type continuously variable transmission, as a structure capable of increasing the number of power rollers 9, 9, conventionally, there is also known a structure of a so called double-cavity type in which, as shown in FIG. 7, input side disks 2A, 2B and output side disks 4A, 4B are disposed by twos on the periphery of an input side rotary shaft 11a and these input side disks 2A, 2B and output side disks 4A, 4B are arranged in parallel to each other in the transmission direction of the power. In the structure shown in FIG. 7, an output gear 12a is supported on the periphery of the intermediate portion of the input side rotary shaft 11a in such a manner that it can be rotated with respect to the input side rotary shaft 11a while it is prevented against movement in the axial direction thereof. That is, a sleeve 22, which is disposed on the central portion of the output gear 12a, is rotatably supported on the middle wall 21 of the housing 5 by a pair of rolling bearings 23, 23 such as angular contact ball bearings. And, the output side disks 4, 4 are spline engaged with the two end portions of the sleeve 22.

Also, the input side disks 2A, 2B are supported on the two end portions of the input side rotary shaft 11a through ball splines 24, 24 in such a manner that they can be shifted in the axial direction thereof as well as can be rotated together with the input side rotary shaft 11a. This input side rotary shaft 11a can be driven or rotated by a drive shaft 20 through the driving/pressing device 10. Of the pair of input side disks 2A, 2B, the input side disk 2A situated on the driving/pressing device 10 side can be moved in the axial direction thereof along the input side rotary shaft 11a as the driving/pressing device 10 operates. On the other hand, the input side disk 2B is butted against a loading nut 25 through a countersunk spring 26 having large elasticity to limit (substantially prevent) the movement of the input side rotary shaft 11a in the axial direction thereof. In the case of the thus structured toroidal-type continuously variable transmission, the transmission of the power from the input side rotary shaft 11a to the output gear 12a is carried out through two routes, that is, one route between one input side disk 2A and output side disk 4 and the other route between the other input side disk 2B and output side disk 4. Thanks to this, great power can be transmitted.

By the way, the support plates 13, 13 (see FIG. 6), which are used to support the two end portions of trunnions 7, 7 to be incorporated into a half toroidal-type continuously variable transmission in such a manner that they can be swung as well as can be shifted in the axial direction thereof, as shown in FIG. 6, are supported on support posts 27a, 27b fixedly disposed within the casing 5 in such a manner that they can be swung as well as can be shifted in the axial direction of the irrespective support posts 27a, 27b (in FIG. 6, in the vertical direction). And, since the pivot shafts 6, 6 disposed on the two end portions of the respective trunnions 7, 7 are supported on the end portions of the thus arranged support plates 13, 13, the trunnions 7, 7 can be swung and can be shifted in the axial direction thereof. It is the gist of the invention to improve the structure of this portion and, therefore, description will be given below in more detail of the structure and operation of this portion with reference to FIG. 8.

A pair of pivot shafts 6, 6, which are concentrically disposed on the two end portions of a trunnion 7, are supported inside circular holes 28, 28 formed in the end portions of a pair of support plates 13, 13 which are disposed so as to hold the trunnion 7 from both sides in the axial direction of the trunnion 7. Therefore, radial needle roller bearings 29 are disposed on the peripheries of the respective pivot shafts 6, 6. Each of outer races 30 forming the respective radial needle roller bearings 29 has an outer peripheral surface which is formed in a spherically convex surface. Each of the outer races 30 is fitted with the inner surface of the circular hole 28 with no play in such a manner that it can be moved in the axial direction and can be swung.

In case where a rod 31 connected to one end portion (in FIG. 8, the lower end portion) of the trunnion 7 is pushed and pulled by the actuator 19 (see FIG. 6), the outer races 30 of the respective radial needle roller bearings 29, 29 are slightly swung as well as (while the center axes of the outer races 30 and the center axes of the circular holes 28 are kept not coincident with each other) are shifted in the axial direction inside the respective circular holes 28, 28. Not only such movements of the respective outer races 30, 30 within the circular holes 28, 28 but also the axial-direction shifting movements of the respective pivot shafts 6, 6 with respect to their associated radial needle roller bearings 29, 29 allow the trunnion 7 to shift in the axial direction thereof. This changes the direction of a force acting on the peripheral surface 9a of a power roller 9 (which will be discussed below) and, when the inclination angle of the trunnion 7 supporting the power roller 9 is changed, the pivot shafts 6, 6, based on the operations of the respective radial needle roller bearings 29, 29 are swung in the twisted rotation direction inside the respective circular holes 28, 28.

A support shaft portion 14 forming a displacement shaft 8 for supporting the power roller 9 on the trunnion 7 is supported in the interior of a circular-shaped support hole 32 formed in the axial-direction middle portion of the trunnion 7 supported between the pair of support plates 13, 13 in the above-mentioned manner by another radial needle roller bearing 33 in such a manner that the support shaft portion 14 can be swung and shifted in the twisted rotation direction. Also, the power roller 9 is rotatably supported on the periphery of a pivot support shaft portion 15 also forming the displacement shaft 8 by still another radial needle roller bearing 34. Between the outer surface of the power roller 9 and the inner surface of the trunnion 7, there are interposed a thrust ball bearing 16 and a thrust needle roller bearing 17 in the order starting from the power roller 9 side. Thanks to this structure, not only the power roller 9 can be rotatably supported while supporting a large thrust load applied to the power roller 9, but also, when torque varies, the power roller 9 is allowed to shift in the axial direction of the respective input side and output side disks 2, 2A, 2B, 4 (see FIGS. 3, 4, 5 and 7).

In the case of the conventional structure in which the trunnion 7 is supported between the pair of support plates 13, 13 in the above-mentioned manner and the power roller 9 is supported on the present trunnion 7, the cost thereof is expensive and it is difficult to realize a structure capable of transmitting greater torque. The reasons for these drawbacks are as follows:

Firstly, the reason for the expensive cost is that, between the trunnion 7 and power roller 9, there are interposed the displacement shaft 8, the pair of radial needle roller bearings 33, 34, thrust ball bearing 16 and thrust needle roller bearing 17 in such a manner that they are combined together in a complicated manner. Also, each of the bearings 33, 34, 16, 17 is constructed by a plurality of parts combined together. Due to this, the number of parts is increased and the assembling operation is troublesome, which gives rise to the expensive cost. Also, since the radial needle roller bearing 34 interposed between the displacement shaft 8 and power roller 9 is operated at a high speed, it is necessary to supply a sufficient amount of lubricating oil to the radial needle roller bearing 34. Such supply of the lubricating oil is executed through lubricating oil passages formed in the interiors of the trunnion 7 and displacement shaft 8. However, it is troublesome to form such lubricating oil passages, with the result that the cost of the structure is inevitably increased.

Also, the reason why it is difficult to realize a structure capable of transmitting greater torque is that, in order to connect together the trunnion 7 and power roller 9 through the displacement shaft 8 and the pair of radial needle roller bearings 33, 34, the support hole 32 is formed in the axial-direction middle portion of the trunnion 7 and the power roller 9 is formed in a hollow annular shape. That is, when the toroidal-type continuously variable transmission is in operation, large radial loads and thrust loads are applied to the two diameter-direction opposite positions of the peripheral surface 9a of the power roller 9 from the inner surfaces 2a, 4a of the input side and output side disks 2, 2A, 2B, 4 (see FIGS. 3, 4, 5 and 7). Also, a large thrust load which is applied to the power roller 9 is applied to the inner surface of the trunnion 7.

When the toroidal-type continuously variable transmission is in operation, the trunnion 7 and power roller 9 are elastically deformed due to these large loads. That is, the trunnion 7 with the two end portions thereof supported is elastically deformed in the direction in which the inner surface of the axial-direction middle portion thereof is turned into a concave surface, whereas the power roller 9 is elastically deformed into an oval shape in which the contact portions thereof with respect to the two inner surfaces 2a, 4a provide a short diameter. And, due to such elastic deformation, there are generated large stresses respectively in the interiors of the trunnion 7 and power roller 9. The thus-generated stresses concentrate not only on the portion of the trunnion 7 that is situated in the periphery of the support hole 32 but also on the near-to-inside-diameter portion of the power roller 9 (the peripheral portion of the center hole thereof). In case where the torque to be transmitted by the toroidal-type continuously variable transmission increases and the above stresses increase further, the durability of the trunnion 7 and power roller 9 cannot be fully secured. To eliminate the durability shortage due to the above causes, the trunnion 7 and power roller 9 may be formed so as to be increased in the thickness. However, in this case, the weights of the trunnion 7 and power roller 9 increase greatly Therefore, to increase the thickness of the trunnion 7 and power roller 9 is not always a proper measure.

SUMMARY OF THE INVENTION

The present invention aims at eliminating the above-mentioned drawbacks found in the conventional toroidal-type continuously variable transmission. Accordingly, it is an object of the invention to provide a toroidal-type continuously variable transmission which not only can secure the durability of the trunnion and power roller without increasing the weights thereof but also can reduce the cost thereof as the need arises.

In attaining the above object, according to a first aspect of the invention, there is provided a toroidal-type continuously variable transmission, including:

a first disk including an inner surface and supported in such a manner as to be rotatable and shiftable in the axial direction thereof;

a second disk including an inner surface and supported concentrically with the first disk in such a manner that, with the inner surface thereof opposed to the inner surface of the first disk, the second disk is rotatable independently of the first disk but is prevented from shifting in the axial direction thereof;

a pressing device for pressing the first disk toward the second disk;

a plurality of trunnions each including in the two end portions thereof two first pivot shafts respectively situated at twisted positions with respect to the center axes of the first and second disks, each of the trunnions being swingable about the first pivot shafts;

a pair of support plates for supporting the first pivot shafts of each of the trunnions;

a plurality of power rollers interposed between the inner surfaces of the first and second disks in such a manner as to be rotatably supported on the trunnions; and, a pair of swing brackets each including a second pivot shaft parallel to the first pivot shaft of each of the trunnions, the swing brackets being respectively supported so as to be swingable about the second pivot shafts with respect to the support plates, wherein the first pivot shafts of each of the trunnions are respectively supported so as to be swingable with respect to the support plates through the swing brackets.

Further, according to a second aspect of the invention, in the toroidal-type continuously variable transmission according to the first aspect, the trunnions are respectively supported on the pair of swing brackets by the first radial needle roller bearings so as to be swingable, and the swing brackets are respectively supported on the support plates by the second radial needle roller bearings so as to be swingable.

Moreover, according to a third aspect of the invention, in the toroidal-type continuously variable transmission according to the first aspect, the trunnions are made of solid members without holes in the axial-direction middle portions thereof, and the power rollers are made of solid members without center holes.

According to a fourth aspect of the invention, there is provided a toroidal-type continuously variable transmission, comprising:

a first disk including an inner surface and supported in such a manner as to be rotatable and shiftable in the axial direction thereof;

a second disk including an inner surface and supported concentrically with the first disk in such a manner that, with the inner surface thereof opposed to the inner surface of the first disk, the second disk is rotatable independently of the first disk but is prevented from shifting in the axial direction thereof;

a pressing device for pressing the first disk toward the second disk;

a plurality of trunnions each including in the two end portions thereof two first pivot shafts respectively situated at twisted positions with respect to the center axes of the first and second disks, each of the trunnions being swingable about the first pivot shafts;

a plurality of power rollers interposed between the inner surfaces of the first and second disks in such a manner as to be rotatably supported on the trunnions; and, a plurality of thrust ball bearings each for allowing the rotation of the power roller while supporting thrust-direction load applied to the power roller, each of the thrust ball bearing comprising:

an inner race raceway formed in the inner surface of the power roller;

an outer race raceway formed in the inner surface of the trunnion;

a plurality of balls rollably interposed between the inner race raceway and the outer race raceway; and, a retainer for holding the balls therein.

According to a fifth aspect of the invention, in the toroidal-type continuously variable transmission according to the fourth aspect, further including:

a pair of support plates for supporting the first pivot shafts of each of the trunnions; and, a pair of swing brackets each including a second pivot shaft parallel to the first pivot shaft of each of the trunnions, the swing brackets being respectively supported so as to be swingable about the second pivot shafts with respect to the support plates, wherein the first pivot shafts of each of the trunnions are respectively supported so as to be swingable with respect to the support plates through the swing brackets.

According to a sixth aspect of the invention, in the toroidal-type continuously variable transmission according to the fifth aspect, the trunnions are respectively supported on the pair of swing brackets by the first radial needle roller bearings so as to be swingable, and the swing brackets are respectively supported on the support plates by the second radial needle roller bearings so as to be swingable.

In addition, according to a seventh aspect of the invention, there is provided a toroidal-type continuously variable transmission, comprising:

a first disk including an inner surface and supported in such a manner as to be rotatable and shiftable in the axial direction thereof;

a second disk including an inner surface and supported concentrically with the first disk in such a manner that, with the inner surface thereof opposed to the inner surface of the first disk, the second disk is rotatable independently of the first disk but is prevented from shifting in the axial direction thereof;

a pressing device for pressing the first disk toward the second disk;

a plurality of trunnions each including in the two end portions thereof two first pivot shafts respectively situated at twisted positions with respect to the center axes of the first and second disks, each of the trunnions being swingable about the first pivot shafts;

a plurality of power rollers interposed between the inner surfaces of the first and second disks in such a manner as to be rotatably supported on the trunnions; and, a plurality of thrust ball bearings each for allowing the rotation of the power roller while supporting thrust-direction load applied to the power roller, each of the thrust ball bearing comprising:

an inner race raceway formed in the inner surface of the power roller;

an outer race raceway formed in an outer race fitted with the inner surface of the trunnion;

a plurality of balls rollably interposed between the inner race raceway and the outer race raceway; and, a retainer for holding the balls therein.

In the case of the above-structured toroidal-type continuously variable transmission according to the invention, the operation to transmit the rotational power between the first and second disks and change the transmission ratio between the first and second disks is similar to the conventional structure which is shown in FIGS. 5 to 7.

Especially, in the toroidal-type continuously variable transmission according to the invention, in case where the components of the transmission such as the first and second disks are elastically deformed when the present transmission is in operation, the swing brackets are respectively swung with respect to their associated support plates to thereby cause the peripheral surfaces of the power rollers to follow the inner surfaces of the first and second disks.

In the case of the structure of the toroidal-type continuously variable transmission according to the invention, there are eliminated not only the need for provision of the displacement shaft, radial needle roller bearings and thrust needle roller bearing but also the lubricating oil passage used to supply lubricating oil to the radial needle roller bearing interposed between the power roller and displacement shaft, which are necessary in the conventional structure. This can decrease the number of parts and the number of working steps and, therefore, the cost of the toroidal-type continuously variable transmission can be reduced.

Also, there is further eliminated the need for formation of the center holes and support holes in the axial-direction middle portions of the power rollers and trunnions. Even in case where there are formed the center holes and support holes in order to reduce the weight of the toroidal-type continuously variable transmission and secure the lubricating oil passage, the center holes and support holes may be formed so as to be smaller in diameter than those formed in the conventional toroidal-type continuously variable transmission. This can relieve the concentration of stresses involved with the power rollers and trunnions, thereby being able to secure the durability of the power rollers and trunnions without increasing the weights thereof.

DETAILED DESCRIPTION OF THE PREFERRED EMBODIMENTS

Figure 1:
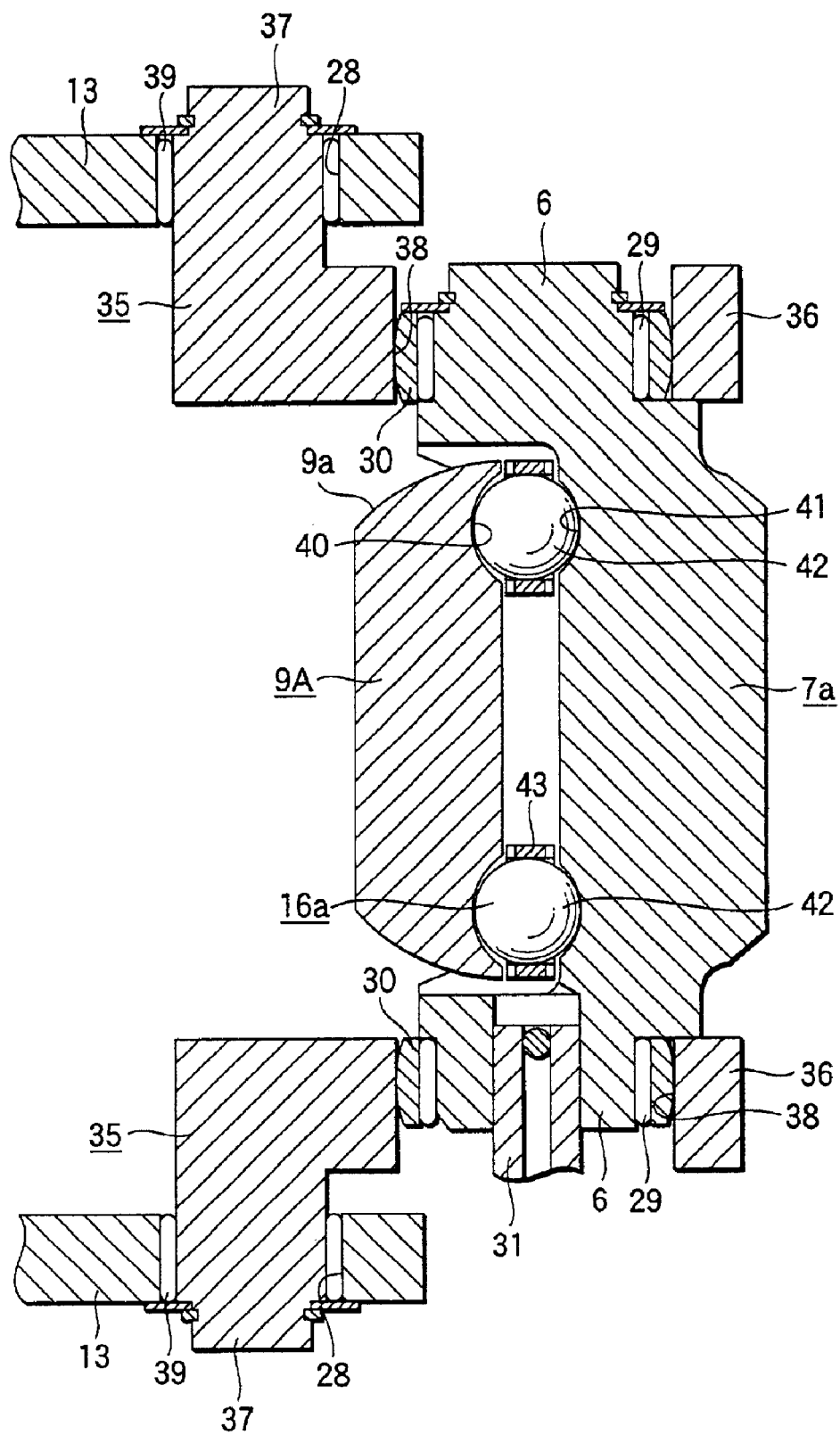
FIG. 1 is a section view (similar to FIG. 8) of the main portions of a first embodiment of a toroidal-type continuously variable transmission according to the invention.
Figure 5:
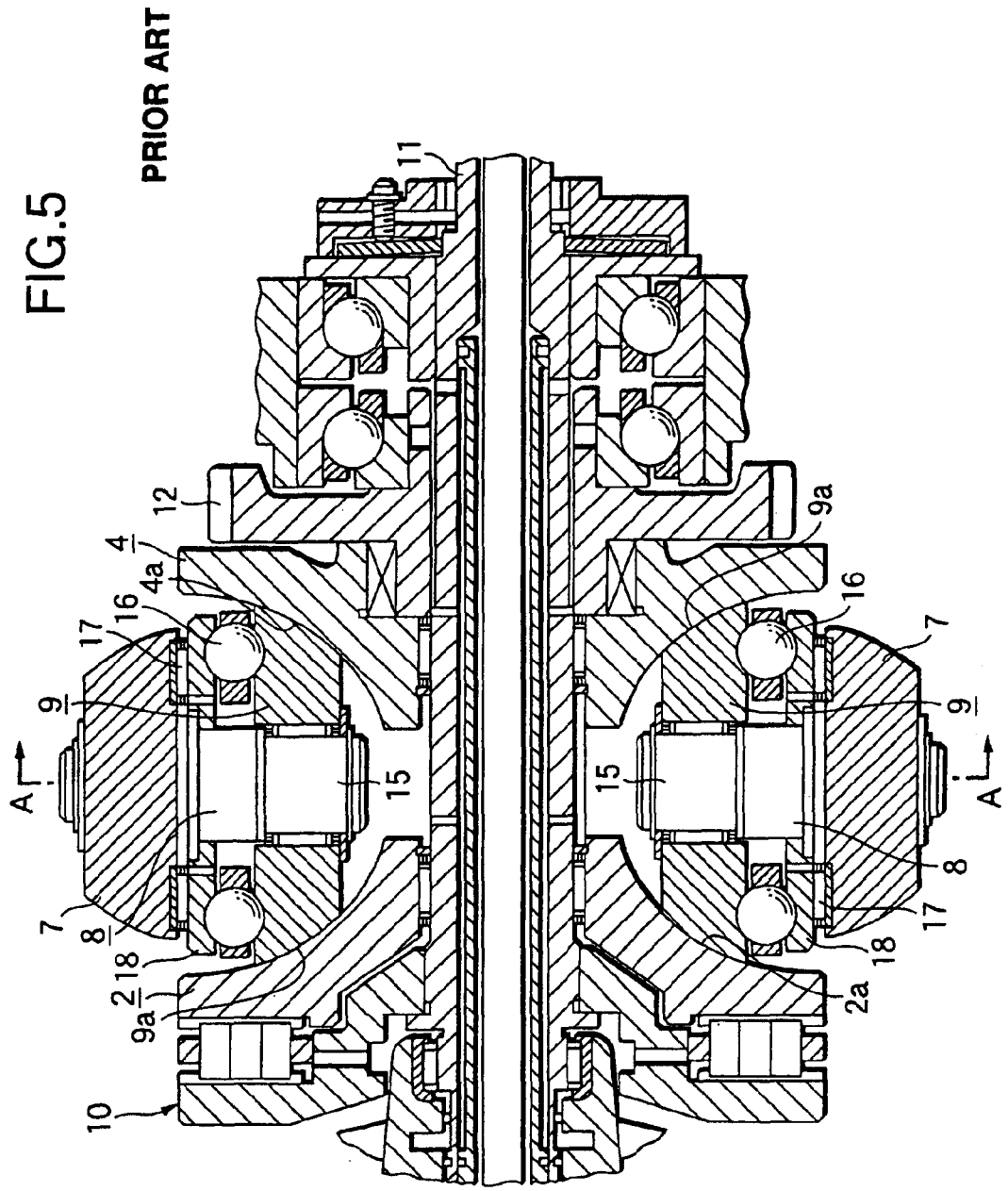
FIG. 5 is a section view of the main portions of the structure of a conventional toroidal-type continuously variable transmission.
Figure 6:
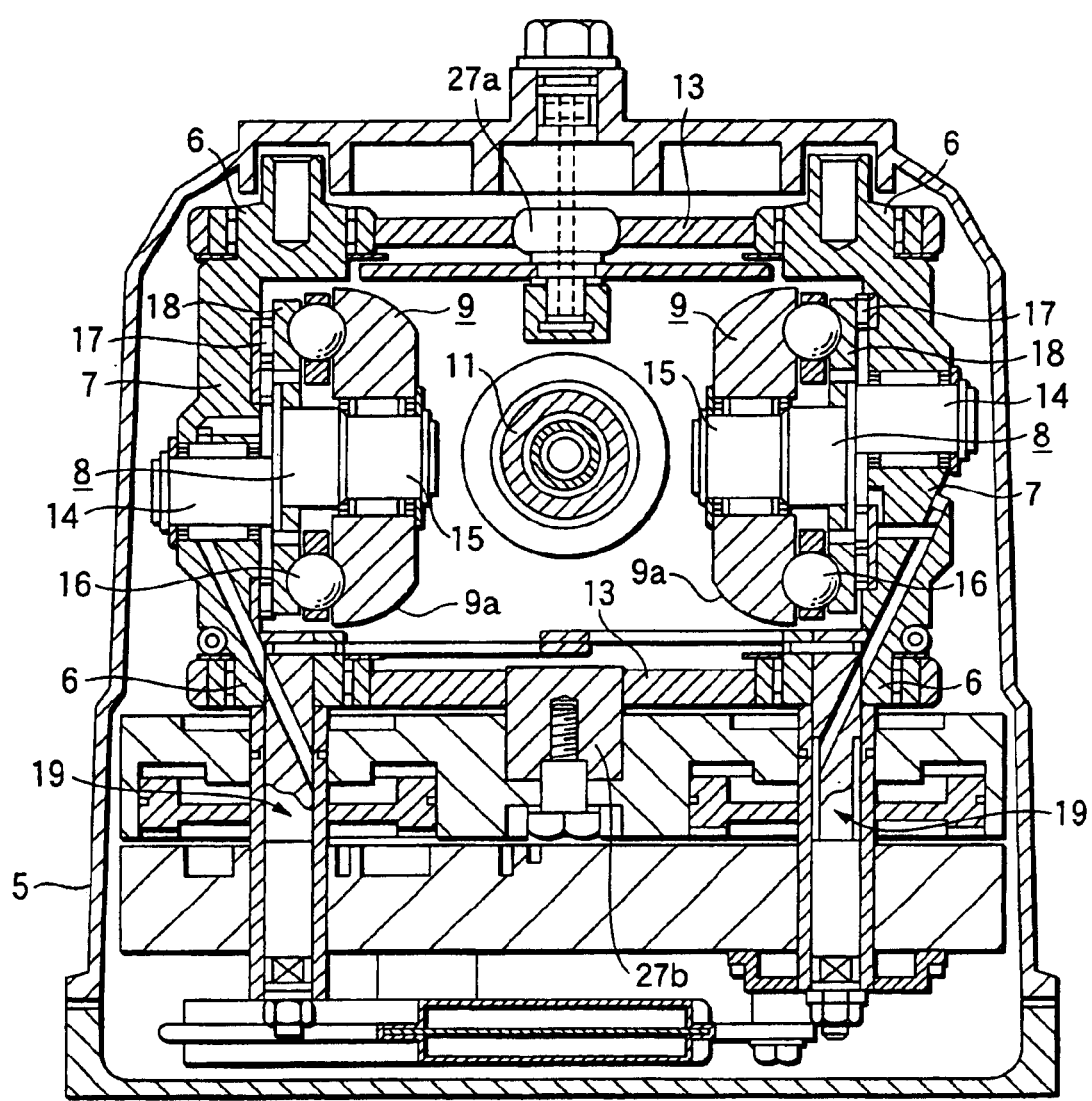
FIG. 6 is a section view taken along the line A—A shown in FIG. 5.

Now, FIG. 1 shows an embodiment of a toroidal-type continuously variable transmission according to the invention. By the way, a toroidal-type continuously variable transmission according to the invention is characterized by the structure of a portion where first pivot shafts 6, 6 respectively disposed on the two end portions of each trunnion 7a are supported on a pair of support plates 13, 13. The structures and operations of the remaining portions of the present embodiment are similar to those of the toroidal-type continuously variable transmission of a single cavity type shown in FIGS. 5 and 6 or the toroidal-type continuously variable transmission of a double cavity type shown in FIG. 7. Therefore, the illustration and description of the same parts are omitted here and thus description will be given below mainly of the characteristic portion of the invention.

In the toroidal-type continuously variable transmission according to the present embodiment, the first pivot shafts 6, 6 are supported on the support plates 13, 13 through swing brackets 35, 35. These support plates 13, 13 are respectively supported within the casing 5 (see FIGS. 6 and 7) in such a manner that they can be swung and can be shifted in the axial direction of the trunnion 7a. Also, each of the swing brackets 35, 35 includes a support plate portion 36 and a second pivot shaft 37 projectedly provided on the outer surface of the base end portion (the opposite surface) of the support plate portion 36. A second circular hole 38 is formed in the front half section of the support plate portion 36. The center axis of the second circular hole 38 and the center axis of the second pivot shaft 37 are parallel to each other.

The second pivot shafts 37 forming the swing brackets 35, 35 each having the above structure are supported in the interiors of the circular holes 28 formed in the end portions of the support plates 13, 13 by second radial needle roller bearings 39 in such a manner that they can be rotated and can be shifted in the axial direction thereof. On the other hand, the first pivot shafts 6, 6 disposed on the two end portions of the trunnion 7a are supported in the second circular holes 38 formed in the front half sections of the support plate portions 36 of the swing brackets 35, 35 by first radial needle roller bearings 29, 29. And, outer races 30 forming the first radial needle roller bearings 29, 29 are respectively arranged such that their respective outer surfaces are formed in a spherically convex surface. The thus formed outer races 30 are fitted into the second circular holes 38 with no play in such a manner that they can be moved in the axial direction thereof and can be swung.

In the present embodiment, the trunnion 7a is made of a solid member which does not include a support hole in the axial-direction middle portion thereof, while a power roller 9A is also made of a solid member which does not have a center hole. And, a plurality of balls 42, 42 are rollably interposed between an inner race raceway 40 formed in the inner surface of the power roller 9A and an outer race raceway 41 formed directly in the inner surface of the trunnion 7a, while they are held by a retainer 43, thereby constituting a thrust ball bearing 16a. Thanks to this structure, the power roller 9A is rotatably supported on the inner surface of the trunnion 7a while supporting a thrust-direction load applied to the power roller 9A. By the way, to the thrust ball bearing 16a, there can be supplied lubricating oil through a hollow pipe-shaped rod 31 and an oil supply passage (not shown) formed in the interior of the trunnion 7a.

In the case of the above-structured toroidal-type continuously variable transmission according to the present embodiment, when in operation, in case where the components such as the input side and output side disks 2, 2A, 2B, 4 are elastically deformed to thereby shift the axial-direction positions of the inner surfaces 2a, 4a of the input side and output side disks 2, 2A, 2B, 4 (see FIGS. 3, 4, 5 and 7), the swing brackets 35, 35 are swung with respect to the support plates 13, 13, respectively. That is, the swing brackets 35, 35 are swung about the second pivot shafts 37 and are thereby shifted in the front and back direction of the sheet of FIG. 1, thereby causing the whole trunnion 7a to shift in the front and back direction of the sheet of FIG. 1. This changes the position of the power roller 9A supported on the inner surface portion of the trunnion 7a with respect to the axial direction of the input side and output side disks 2, 2A, 2B, 4, thereby causing the peripheral surface 9a of the power roller 9A to follow the inner surfaces 2a, 4a of the input side and output side disks 2, 2A, 2B, 4.

Due to the engagement between the inner surfaces 2a, 4a and the peripheral surface 9a of the power roller 9A, a radial load based on a large thrust load which is applied to the power roller 9A is applied to the oscillatory support portions of the second pivot shafts 37, 37 with respect to the support plates 13, 13. However, since the second radial needle roller bearings 39 are disposed on the above-mentioned oscillatory support portions, the following operation of the peripheral surface 9a with respect to the inner surfaces 2a, 4a can be performed smoothly. Therefore, in the traction portion in which the inner surfaces 2a, 4a are contacted with the peripheral surface 9a to transmit the power between them, there can be secured a sufficient contact pressure, which can restrict an increase in the degree of slippage of the traction portion, thereby being able to prevent the power transmission efficiency from lowering and gross slippage from occurring.

Figure 7:
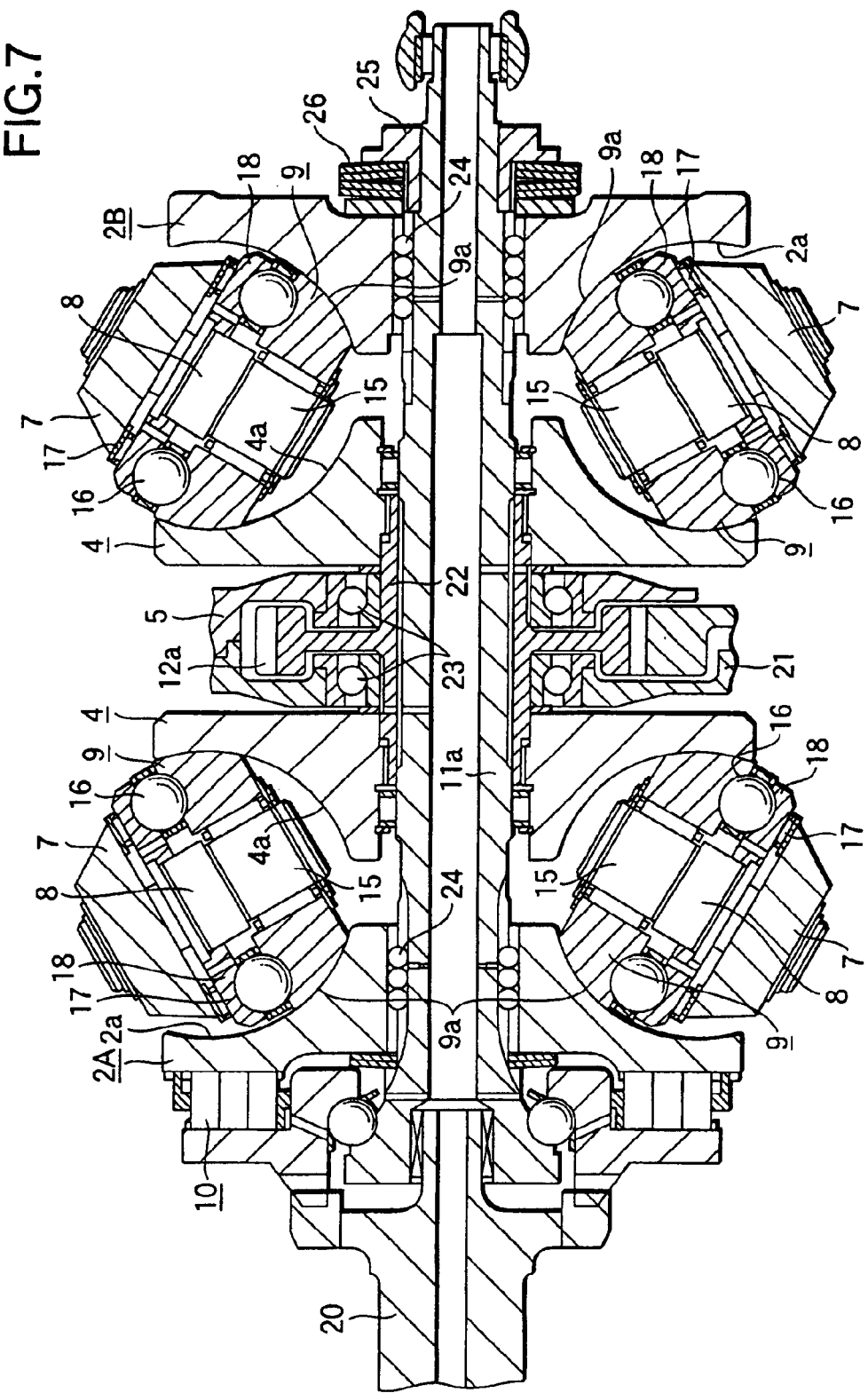
FIG. 7 is a section view of the main portions of the structure of a conventional toroidal-type continuously variable transmission of a double cavity type; and, FIG. 8 is a section view of the main portions of a toroidal-type continuously variable transmission used to explain the problems to be solved by the invention, corresponding to the upper right portion of FIG. 6.
Figure 8:
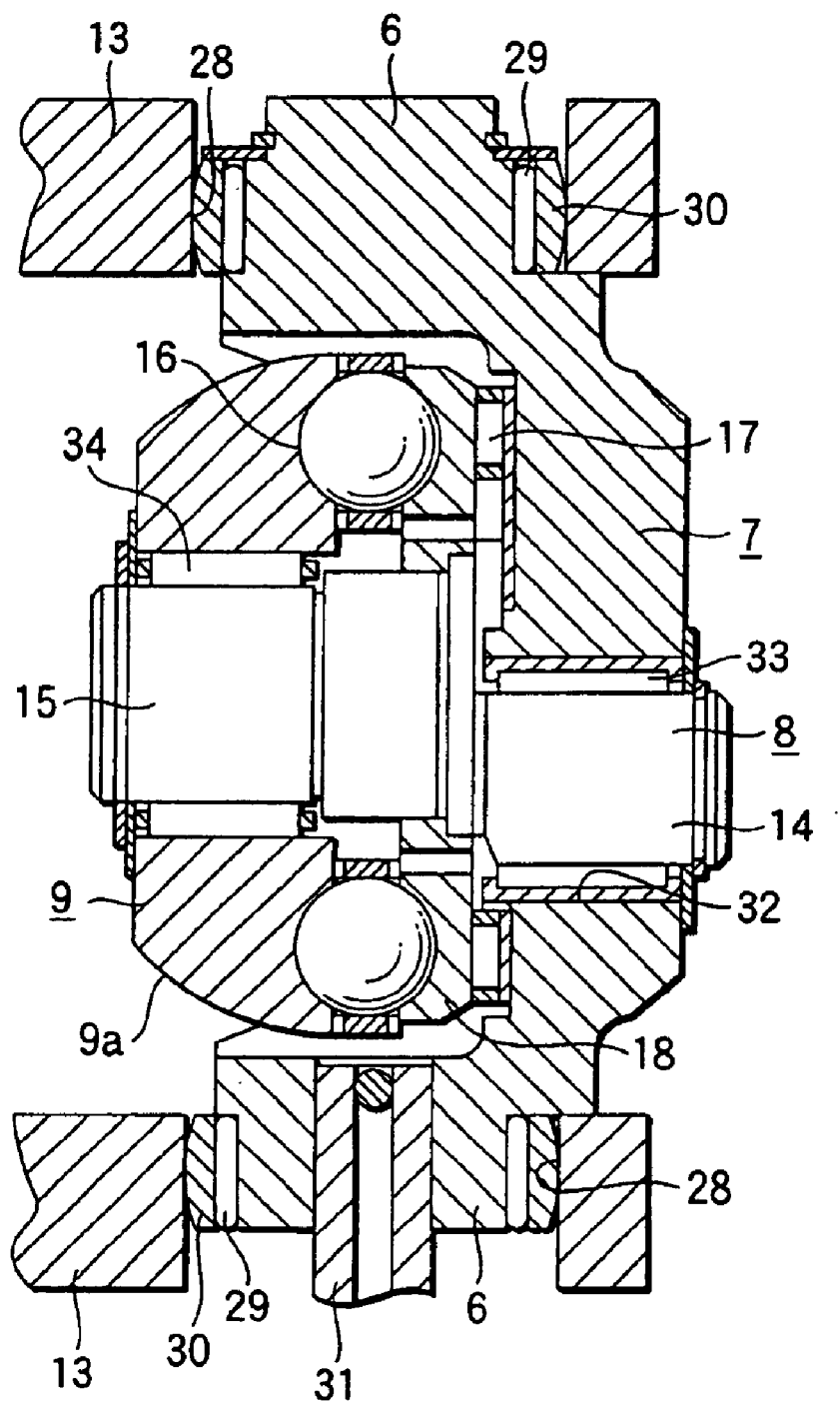

According to the above-structured toroidal-type continuously variable transmission according to the present embodiment, there are eliminated not only the need for provision of the displacement shaft 8, radial needle roller bearings 33, 34 and thrust needle roller bearing 17 but also the need for formation of the lubricating oil passage used to supply lubricating oil to the radial needle roller bearing 33 interposed between the power roller 9 and displacement shaft 8, which have been necessary in the conventional structure shown in FIG. 7. Also, there is eliminated the need for the operation to form the center holes and support holes 32 with the inside diameter dimensions thereof regulated severely in the power roller 9 and trunnion 7. This can decrease the number of parts and the number of working steps to thereby be able to reduce the cost of the toroidal-type continuously variable transmission. Especially, the mechanism for forming the lubricating oil passage in the interior of the displacement shaft 8 made of hard material as well as the mechanism for feeding the lubricating oil from the trunnion 7 into the lubricating oil passage side formed in the interior of the displacement shaft 8 which can be swung with respect to the trunnion 7 are both complicated, which gives rise to the expensive cost of the toroidal-type continuously variable transmission. However, according to the present embodiment, since both of these mechanisms can be omitted, the cost of the toroidal-type continuously variable transmission can be reduced sufficiently. By the way, even in the present embodiment as well, the lubricating oil passage for supplying the lubricating oil to the thrust ball bearing 16a must be formed in the interior of the trunnion 7a. However, in the case of the lubricating oil passage, the downstream end portion thereof may be only formed so as to be open to the inner surface of the middle portion of the trunnion 7a, which does not make troublesome the lubricating oil passage forming operation or the components assembling operation.

Also, in the case of the toroidal-type continuously variable transmission according to the present embodiment, no center hole or support hole is formed in the axial-direction middle portions of the power roller 9A and trunnion 7a, but the power roller 9A and trunnion 7a are respectively made of solid members This can relieve the concentration of the stresses involved with the power roller 9A and trunnion 7a and, therefore, the durability of the power roller 9A and trunnion 7a can be secured without increasing the weights of the power roller 9A and trunnion 7a. That is, omission of the center hole and support hole not only can enhance the rigidity of the power roller 9A and trunnion 7a to thereby make it difficult for the power roller 9A and trunnion 7a to be deformed elastically but also can eliminate the stress-easy-to-concentrate portions from the power roller 9A and trunnion 7a, which makes it possible to enhance the durability of the power roller 9A and trunnion 7a.

Figure 2:
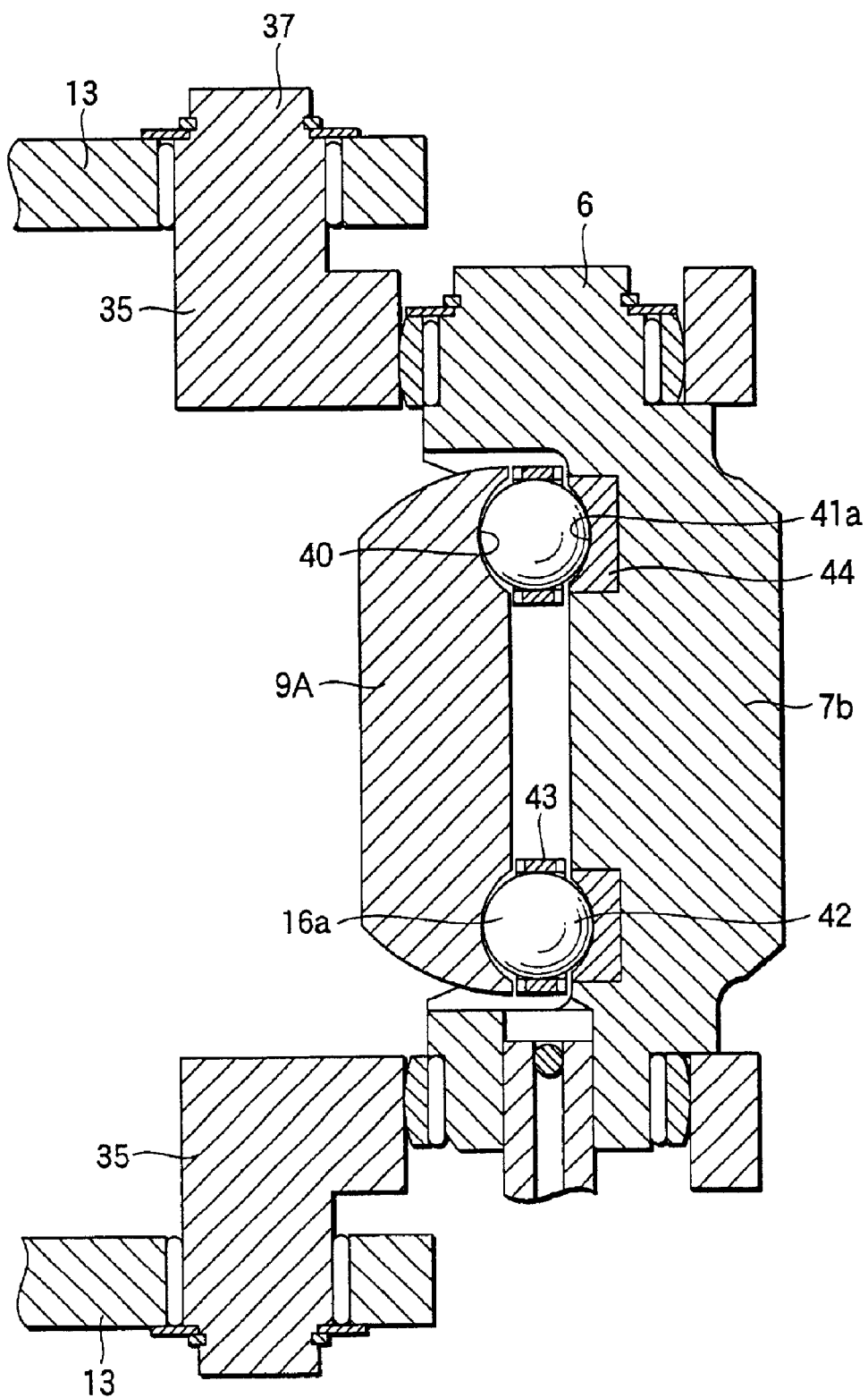
FIG. 2 is a section view of the main portions of a second embodiment of a toroidal-type continuously variable transmission according to the invention.
Figure 3:
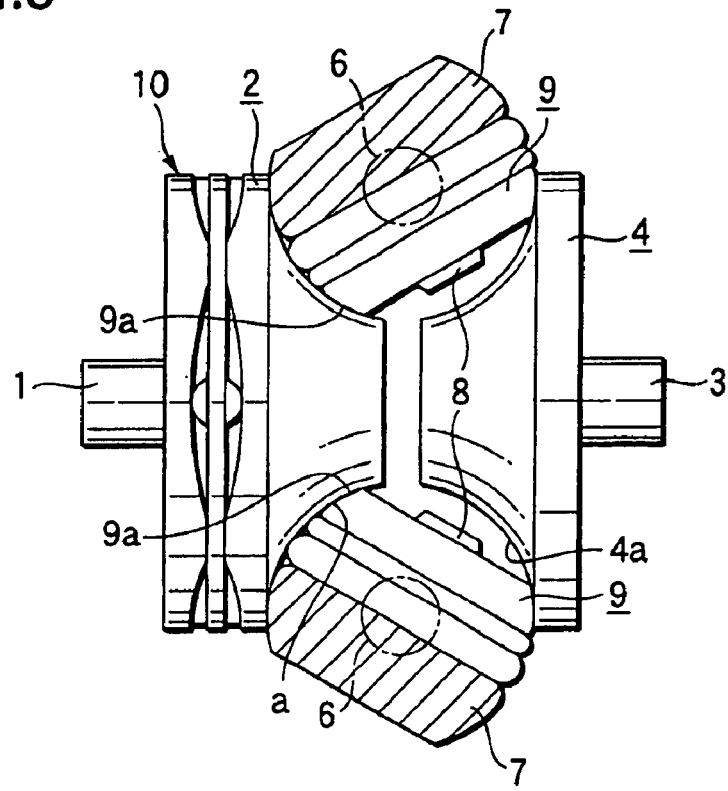
FIG. 3 is a schematic side view of the basic structure of a toroidal-type continuously variable transmission, showing a state in which the rotation speed thereof is reduced down to the maximum.
Figure 4:
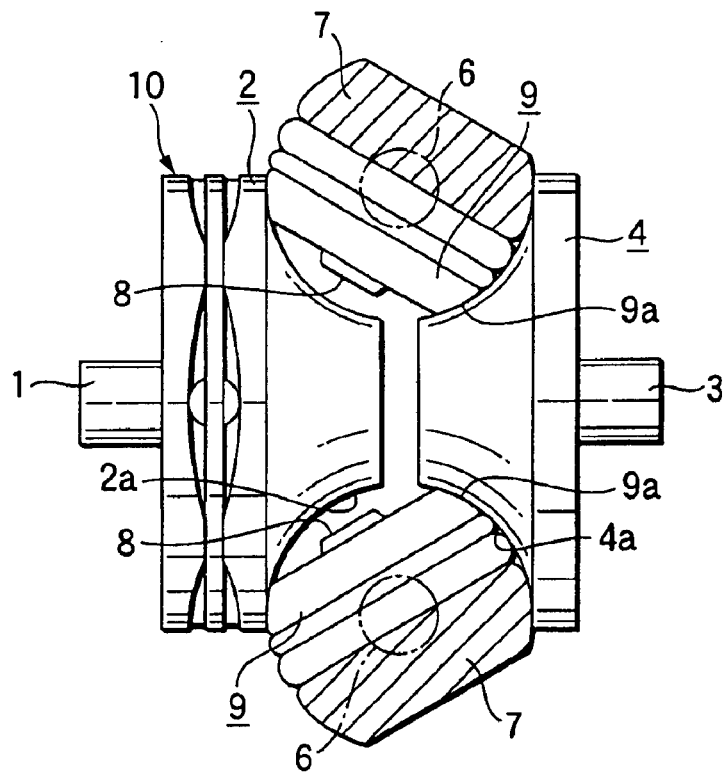
FIG. 4 is a schematic side view of the basic structure of a toroidal-type continuously variable transmission, showing a state in which the rotation speed thereof is increased up to the maximum.

By the way, in the present embodiment, the outer race raceway 41 forming the thrust ball bearing 16a is formed directly in the inner surface of the trunnion 7a. However, alternatively, as shown in FIG. 2, the outer race raceway 41 can also be formed in an outer race 44 which is produced separately from the main body portion of the trunnion 7b and, after then, the outer race 44 can be fitted with and fixed to the main body portion of the trunnion 7b. This structure not only can facilitate the execution of a quenching effect treatment on the surface portion of the outer race raceway 41a but also can facilitate the heat treatment on the main body portion of the trunnion 7b under the optimum conditions. Also, in the case of the second radial needle roller bearings 39 interposed between the circular holes 28 formed in the end portions of the support plates 13, 13 and the second pivot shafts 37 of the swing brackets 35, outer races each having an outer peripheral surface formed in a spherically convex surface can also be incorporated into the second radial needle roller bearings 39.

While only certain embodiments of the invention have been specifically described herein, it will apparent that numerous modifications may be made thereto without departing from the spirit and scope of the invention.

Since the invention is structured and operates in the above-mentioned manner, the invention is able to realize a toroidal-type continuously variable transmission which can secure sufficient durability even when transmitting large torque and also can be structured light in weight at a low cost.

What is claimed is:

1. A half-toroidal continuously variable transmission, comprising:
    a first disk including an inner surface and supported in such a manner as to be rotatable and shiftable in the axial direction thereof;
    a second disk including an inner surface and supported concentrically with said first disk in such a manner that, with said inner surface thereof opposed to said inner surface of said first disk, said second disk is rotatable independently of said first disk but is prevented from shifting in the axial direction thereof;
    a pressing device for pressing said first disk toward said second disk;
    a plurality of trunnions each including in the two end portions thereof two first pivot shafts respectively situated at twisted positions with respect to the center axes of said first and second disks, each of said trunnions being swingable about said first pivot shafts;
    a pair of support plates for supporting said first pivot shafts of each of said trunnions;
    a plurality of power rollers interposed between said inner surfaces of said first and second disks in such a manner as to be rotatably supported on said trunnions; and,
    a pair of swing brackets each including a second pivot shaft parallel to said first pivot shaft of each of said trunnions, said swing brackets being respectively supported so as to be swingable about axes of said second pivot shafts with respect to said support plates,
    wherein said first pivot shafts of each of said trunnions are respectively supported so as to be swingable with respect to said support plates through said swing brackets, and the trunnions configured to rotate relative to the swing brackets about axes of the first pivot shafts.

2. The half-toroidal continuously variable transmission according to claim 1, wherein said trunnions are respectively supported on said pair of swing brackets by first radial needle roller bearings so as to be swingable, and, wherein said swing brackets are respectively supported on said support plates by second radial needle roller bearings so as to be swingable.

3. The half-toroidal continuously variable transmission according to claim 1, wherein said trunnions are made of solid members without holes in the axial-direction middle portions thereof, and said power rollers are made of solid members without center holes.

4. A half-toroidal continuously variable transmission comprising:

a first disk including an inner surface and supported in such a manner as to be rotatable and shiftable in the axial direction thereof;

a second disk including an inner surface and supported concentrically with said first disk in such a manner that, with said inner surface thereof opposed to said inner surface of said first disk, said second disk is rotatable independently of said first disk but is prevented from shifting in the axial direction thereof;

a pressing device for pressing said first disk toward said second disk;

a plurality of trunnions each including in the two end portions thereof two first pivot shafts respectively situated at twisted positions with respect to the center axes of said first and second disks, each of said trunnions being swingable about said first pivot shafts;

a pair of support plates for supporting said first pivot shafts of each of said trunnions;

a pair of swing brackets each including a second pivot shaft parallel to said first pivot shaft of each of said trunnions, said swing brackets being respectively supported so as to be swingable about said second pivot shafts with respect to said support plates, wherein said first pivot shafts of each of said trunnions are respectively supported so as to be swingable with respect to said support plates through said swing brackets;

a plurality of power rollers interposed between said inner surfaces of said first and second disks in such a manner as to be rotatably supported on said trunnions; and, a plurality of thrust ball bearings each for allowing the rotation of said power roller while supporting thrust-direction load applied to said power roller, each of said thrust ball bearings comprising:

an inner race raceway formed in the inner surface of said power roller;

an outer race raceway formed in the inner surface of said trunnion;

a plurality of balls rollably interposed between said inner race raceway and said outer race raceway; and, a retainer for holding said balls therein.

5. The half-toroidal continuously variable transmission according to claim 4, wherein said trunnions are respectively supported on said pair of swing brackets by first radial needle roller bearings so as to be swingable, and wherein said swing brackets are respectively supported on said support plates by second radial needle roller bearings so as to be swingable.

* * * * *